US012738138B2

(12) United States Patent
Shikita et al.

(10) Patent No.: US 12,738,138 B2
(45) Date of Patent: Sep. 15, 2026

(54) INFORMATION PROVIDING DEVICE, INFORMATION PROVIDING METHOD, AND ALERTING DEVICE

(71) Applicant: MAXELL, LTD., Kyoto (JP)

(72) Inventors: Kazuo Shikita, Otokuni-gun (JP); Tomonori Hirabayashi, Otokuni-gun (JP); Shuji Nagatomi, Otokuni-gun (JP)

(73) Assignee: Maxell, Ltd., Kyoto (JP)

(*) Notice: Subject to any disclaimer, the term of this patent is extended or adjusted under 35 U.S.C. 154(b) by 7 days.

(21) Appl. No.: 18/869,586

(22) PCT Filed: May 18, 2023

(86) PCT No.: PCT/JP2023/018658

§ 371 (c)(1),
(2) Date: Nov. 26, 2024

(87) PCT Pub. No.: WO2023/234065

PCT Pub. Date: Dec. 7, 2023

(65) Prior Publication Data

US 2025/0299547 A1 Sep. 25, 2025

(30) Foreign Application Priority Data

May 31, 2022 (JP) ................................ 2022-088311

(51) Int. Cl.

| | |
|---|---|
| ***G08B 21/02*** | (2006.01) |
| ***G08G 1/09*** | (2006.01) |
| ***G08G 1/16*** | (2006.01) |

(52) U.S. Cl.

CPC ............... *G08B 21/02* (2013.01); *G08G 1/09* (2013.01); *G08G 1/16* (2013.01)

(58) Field of Classification Search

CPC .......... G08B 21/00; G08B 21/02; G08G 1/09; G08G 1/16; H04R 1/00; H04R 1/02; G01C 21/36; G06F 3/01; G06F 19/00

See application file for complete search history.

(56) References Cited

U.S. PATENT DOCUMENTS

2004/0267455 A1 12/2004 Hatano et al.
2009/0248292 A1 10/2009 Adachi et al.

(Continued)

FOREIGN PATENT DOCUMENTS

JP 2002-123896 A 4/2002
JP 2003-214864 A 7/2003

(Continued)

OTHER PUBLICATIONS

International Search Report and Written Opinion received in International Application No. PCT/JP2023/018658, dated Jul. 25, 2023.

*Primary Examiner* — Van T Trieu

(74) *Attorney, Agent, or Firm* — Rimon P.C.

(57) ABSTRACT

An information providing device according to embodiments includes a control unit. The control unit is configured to acquire positional information of the target person. The control unit is configured to inform, as alerting information, the target person of position associated information that coincides with positional information of the target person and that coincides with a type of position associated information tied to identification information of the target person, among position associated information tied to positional information.

12 Claims, 14 Drawing Sheets

(56) References Cited

U.S. PATENT DOCUMENTS

| | | | | |
|---|---|---|---|---|
| 2016/0140847 | A1 | 5/2016 | Kawamata et al. | |
| 2017/0228513 | A1* | 8/2017 | Zhang | G06Q 10/06 |
| 2018/0048950 | A1* | 2/2018 | Benzaia | H04N 23/90 |
| 2018/0257658 | A1* | 9/2018 | Cho | H04L 67/306 |

FOREIGN PATENT DOCUMENTS

| | | | |
|---|---|---|---|
| JP | 2005-38381 | A | 2/2005 |
| JP | 2008-003828 | A | 1/2008 |
| JP | 2009-9281 | A | 1/2009 |
| JP | 2009-217350 | A | 9/2009 |
| JP | 2014-20989 | A | 2/2014 |
| JP | 6149846 | B2 | 6/2017 |
| WO | 2007/114015 | A1 | 10/2007 |

* cited by examiner

FIG.5

| user ID | AGE | GENDER | TYPE OF NOTIFICATION REQUESTED INFORMATION | IDENTIFICATION INFORMATION OF ALERTING DEVICE |
|---|---|---|---|---|
| 0001 | EQUAL TO OR LESS THAN 10 YEARS | FEMALE | COMMUTING STUDENT TRAFFIC ACCIDENT INFORMATION SUSPICIOUS-PERSON INFORMATION | abcde |
| 0002 | 21 TO 30 YEARS | FEMALE | SUSPICIOUS-PERSON INFORMATION ROBBERY·SNATCHING INFORMATION | stuGhr |
| 0003 | EQUAL TO OR MORE THAN 60 YEARS | MALE | WALKING ELDERLY PEOPLE TRAFFIC ACCIDENT INFORMATION | xyzAab |
| ⋮ | ⋮ | ⋮ | ⋮ | ⋮ |

FIG.6

| OCCURRENCE POSITIONAL INFORMATION | POSITION ASSOCIATED INFORMATION | NUMBER OF OCCURRENCES |
|---|---|---|
| xxx, yyy1 | PEDESTRIAN TRAFFIC ACCIDENT | 4 |
| | COMMUTING STUDENT TRAFFIC ACCIDENT | 3 |
| | SUSPICIOUS-PERSON REPORT | 3 |
| xxx, yyy2 | SNATCHING | 1 |
| aaa 2-CHOME SHINJYUKU-KU | TRAFFIC ACCIDENT | 20 |
| | CRIME OCCURRENCE | 11 |
| | SUSPICIOUS-PERSON REPORT | 9 |
| INTERSECTION IN SHIBUYA-KU 3-CHOME | TRAFFIC ACCIDENT | 14 |
| | PEDESTRIAN TRAFFIC ACCIDENT | 6 |
| | WALKING ELDERLY PEOPLE TRAFFIC ACCIDENT | 3 |
| | COMMUTING STUDENT TRAFFIC ACCIDENT | 1 |
| | BICYCLE TRAFFIC ACCIDENT | 5 |
| ⋮ | ⋮ | ⋮ |

FIG.11

| OCCURRENCE POSITIONAL INFORMATION | ADVANCING DIRECTION INFORMATION | POSITION ASSOCIATED INFORMATION | NUMBER OF OCCUR-RENCES |
|---|---|---|---|
| xxx, yyy1 | | PEDESTRIAN TRAFFIC ACCIDENT | 4 |
| | | COMMUTING STUDENT TRAFFIC ACCIDENT | 3 |
| | | SUSPICIOUS-PERSON REPORT | 3 |
| xxx, yyy2 | | SNATCHING | 1 |
| aaa 2-CHOME SHINJYUKU-KU | | TRAFFIC ACCIDENT | 20 |
| | | CRIME OCCURRENCE | 11 |
| | | SUSPICIOUS-PERSON REPORT | 9 |
| INTERSECTION IN SHIBUYA-KU 3-CHOME | VISIBILITY VIEWED FROM EAST SIDE IS POOR IN ENTERING ALONG NORTH-SOUTH DIRECTION | TRAFFIC ACCIDENT | 14 |
| | | PEDESTRIAN TRAFFIC ACCIDENT | 6 |
| | | WALKING ELDERLY PEOPLE TRAFFIC ACCIDENT | 3 |
| | | COMMUTING STUDENT TRAFFIC ACCIDENT | 1 |
| | | BICYCLE TRAFFIC ACCIDENT | 5 |
| ⋮ | | ⋮ | ⋮ |

FIG.15

| user ID | AGE | GENDER | TYPE OF NOTIFICATION REQUESTED INFORMATION | NOTIFICATION TIMING | IDENTIFICATION INFORMATION OF ALERTING DEVICE |
|---|---|---|---|---|---|
| 0001 | EQUAL TO OR LESS THAN 10 YEARS | FEMALE | COMMUTING STUDENT TRAFFIC ACCIDENT INFORMATION SUSPICIOUS-PERSON INFORMATION | TEN SECONDS BEFORE | abcde |
| 0002 | 21 TO 30 YEARS | FEMALE | SUSPICIOUS-PERSON INFORMATION ROBBERY·SNATCHING INFORMATION | ONE MINUTE BEFORE | stuGhr |
| 0003 | EQUAL TO OR MORE THAN 60 YEARS | MALE | WALKING ELDERLY PEOPLE TRAFFIC ACCIDENT INFORMATION | THIRTY SECONDS BEFORE | xyzAab |
| ⋮ | ⋮ | ⋮ | ⋮ | ⋮ | ⋮ |

INFORMATION PROVIDING DEVICE, INFORMATION PROVIDING METHOD, AND ALERTING DEVICE

CROSS-REFERENCE TO RELATED APPLICATIONS

This application is national stage application of International Application No. PCT/JP2023/018658, filed on May 18, 2023, which designates the United States, incorporated herein by reference, and which claims the benefit of priority from Japanese Patent Application No. 2022-088311, filed on May 31, 2022, the entire contents of which are incorporated herein by reference.

FIELD

The present disclosure relates to an information providing device, an information providing method, and an alerting device.

BACKGROUND

Conventionally, there has been known a danger information notifying system configured to report danger information related to school routes of students (see Patent Literature 1, for example).

CITATION LIST

Patent Literature

Patent Literature 1: Japanese Laid-open Patent Publication No. 2008-003828

SUMMARY

Technical Problem

However, in the above-mentioned technology, notification information to be reported is decided with respect to a target person that is a target of the notification, and thus the above-mentioned technology has a room for improvement in providing necessary notification information to the target person.

The disclosed techniques have been made in view of the aforementioned, and an object of embodiments is to provide an information providing device, an information providing method, and an alerting device capable of reporting notification information according to a person that is a target of the notification.

Solution to Problem

An information providing device according to one aspect of embodiments includes a control unit. The control unit informs a target person of alerting information that is a target of a notification. The control unit is configured to: acquire positional information of the target person; and inform, as alerting information, the target person of position associated information that coincides with positional information of the target person and that coincides with a type of position associated information tied to identification information of the target person, among position associated information tied to positional information.

Thus, the information providing device is capable of reporting alerting information according to a person to be informed. The information providing device is capable of informing a target person of alerting information that is desired to be reported to the target person. The information providing device is capable of reporting alerting information preferable to a target person in accordance with positional information of the target person.

In the information providing device according to one aspect of the embodiments, the control unit is further configured to: inform, as the alerting information, the target person of position associated information in a case where a moving direction of the target person is a direction approaching a position indicated by the positional information tied to the position associated information, among position associated information tied to positional information.

Thus, the information providing device is capable of informing a target person of position associated information to be reported to the target person. For example, the information providing device does not inform, as alerting information, a target person of position associated information in a case where a moving direction of the target person is a direction that is going away from a position indicated by positional information tied to the position associated information. Therefore, the information providing device is capable of reporting alerting information preferable to a target person alone.

In the information providing device according to one aspect of the embodiments, the control unit is further configured to: regardless of the positional information of the target person, inform the target person of predetermined emergency notification information.

Thus, the information providing device is capable of informing a target person of emergency notification information having urgency.

The information providing device according to one aspect of the embodiments further includes a storage. The storage stores therein, in a case where the position associated information tied to the positional information is acquired from an external device, the acquired position associated information tied to the positional information.

Thus, the information providing device is capable of acquiring new position associated information from an external device, so that it is possible to increase position associated information stored in the storage. Therefore, the information providing device is capable of further reporting alerting information preferable to a target person.

In the information providing device according to one aspect of the embodiments, the control unit is further configured to: change a notification method of the alerting information depending on the target person.

Thus, the information providing device is capable of informing a target person of alerting information by a preferable method. Therefore, the information providing device is capable of raising an alert in the target person with respect to alerting information, so that it is possible to contributing to improvement in the safety of the target person.

In the information providing device according to one aspect of the embodiments, the position associated information tied to the positional information includes advancing direction information. The control unit is further configured to: inform, as the alerting information, the target person of position associated information in a case where a moving direction of the target person coincides with a moving direction in the advancing direction information, among position associated information tied to positional information.

Thus, the information providing device is capable of informing a target person of position associated information to be reported to the target person. For example, the information providing device does not inform, as alerting information, a target person of position associated information in a case where a moving direction of the target person does not coincide with a moving direction in advancing direction information. Therefore, the information providing device is capable of reporting alerting information preferable to a target person alone.

In the information providing device according to one aspect of the embodiments, the advancing direction information includes information related to a direction to be careful about in an advancing direction. The control unit is further configured to: inform the target person of the direction about which the target person should be careful.

Thus, the information providing device informs a target person of an alert direction to be able to further contribute to improvement in the safety of the target person.

In the information providing device according to one aspect of the embodiments, the control unit is further configured to: change a timing for informing the target person of the alerting information in accordance with a moving speed of the target person.

Thus, the information providing device is capable of reporting alerting information at a preferable timing in accordance with a moving speed of a target person. Therefore, the information providing device is capable of further contributing to improvement in the safety of a target person.

In the information providing device according to one aspect of the embodiments, the control unit is further configured to: change a timing for informing the target person of the alerting information depending on the target person.

Thus, the information providing device is capable of improving a raise of an alert in a target person with respect to alerting information.

In the information providing device according to one aspect of the embodiments, the position associated information tied to the positional information includes notification time interval information. The control unit is further configured to: inform, as the alerting information, the target person of position associated information in a case where a passage time point of the target person is included in a time interval related to the notification time interval information, among position associated information tied to positional information.

Thus, the information providing device is capable of informing a target person of position associated information to be reported to the target person. For example, the information providing device does not inform, as alerting information, a target person of position associated information in a case where a passage time point of the target person is outside a time interval related to the notification time interval information. Therefore, the information providing device is capable of reporting alerting information preferable to a target person alone.

In the information providing device according to one aspect of the embodiments, the position associated information tied to the positional information includes at least one of danger occurrence information, crime occurrence information, and accident occurrence information.

Thus, the information providing device is capable of raising an alert in a target person with respect to at least one of danger occurrence information, crime occurrence information, and accident occurrence information. Therefore, the information providing device is capable of further contributing to improvement in the safety of a target person.

Advantageous Effects of Invention

According to one aspect of embodiments, it is possible to inform a target person of notification information according to the target person.

BRIEF DESCRIPTION OF DRAWINGS

FIG. 5 is a diagram illustrating one example of a registration information DB according to the first embodiment.

FIG. 6 is a diagram illustrating one example of a position associated information DB according to the first embodiment.

FIG. 11 is a diagram illustrating one example of a position associated information DB according to the third embodiment.

FIG. 15 is a diagram illustrating one example of a registration information DB according to the modification of the fourth embodiment.

DESCRIPTION OF EMBODIMENTS

Hereinafter, modes (hereinafter, may be referred to as "embodiments") for implementing an information providing device, an information providing method, and an alerting device will be described in detail with reference to the accompanying drawings. In addition, the illustrative embodiments disclosed below are not intended to limit the information providing device, the information providing method, and the alerting device according to the present application.

First Embodiment

Figure 1:
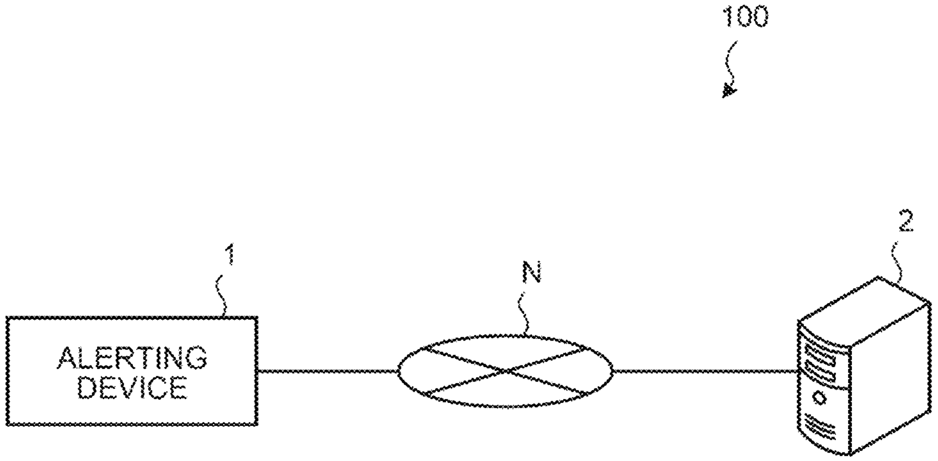
FIG. 1 is a block diagram illustrating one example of the outline of an alerting system according to a first embodiment.

An alerting system 100 according to a first embodiment will be explained with reference to FIG. 1. FIG. 1 is a block diagram illustrating one example of the outline of the alerting system 100 according to the first embodiment.

The alerting system 100 includes an alerting device 1 and an information providing device 2. The alerting device 1 and the information providing device 2 are connected via a network N such as the Internet to be able to communicate with each other in a wired or wireless manner. The alerting system 100 includes the plurality of alerting devices 1. The alerting system 100 may include the plurality of information providing devices 2.

Figure 2:
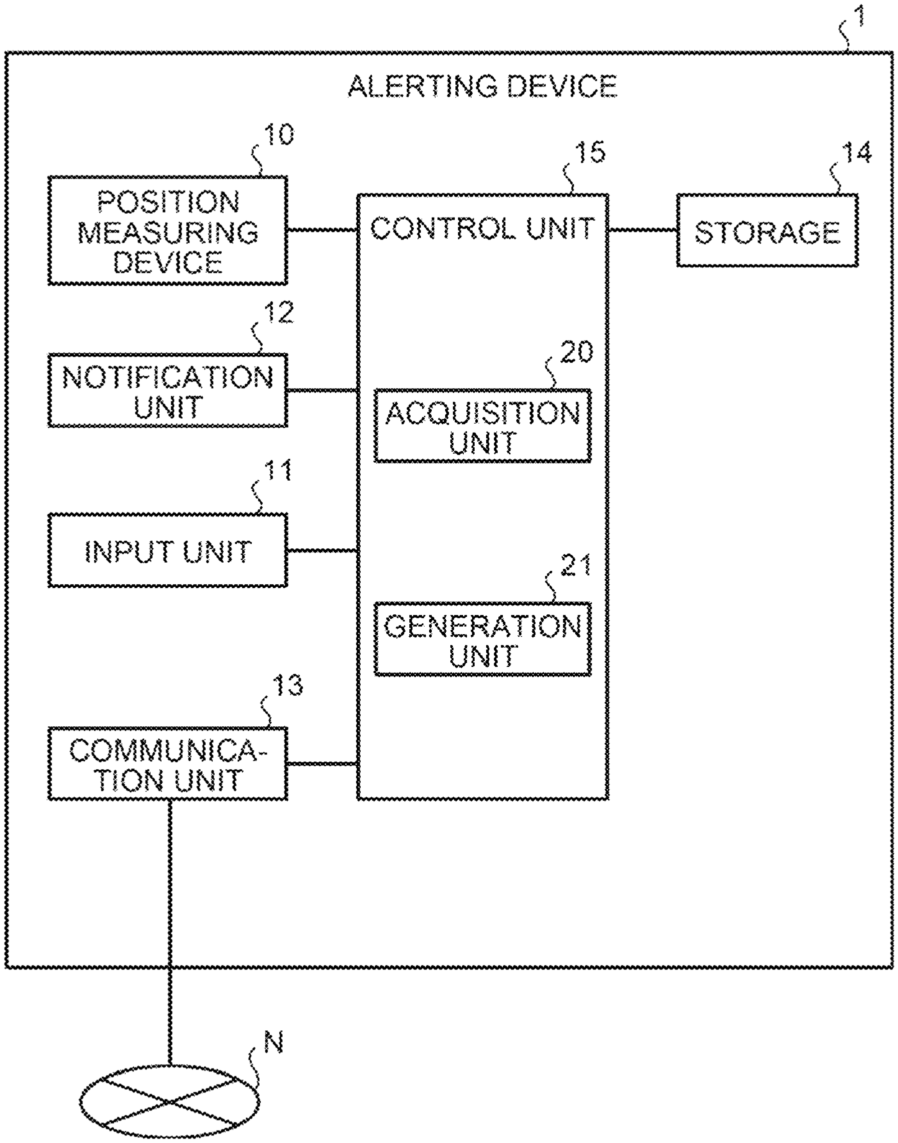
FIG. 2 is a block diagram illustrating one example of a configuration of an alerting device according to the first embodiment.

The alerting device 1 will be explained with reference to FIG. 2. FIG. 2 is a block diagram illustrating one example of a configuration of the alerting device 1 according to the first embodiment. The alerting device 1 is a device configured to report alerting information that is received from the information providing device 2.

The alerting information is information that raises an alert in a user having the alerting device 1. The user having the alerting device 1 is a target person that receives a notification of alerting information. Hereinafter, the user having the alerting device 1 may be referred to as a "user". The alerting information includes at least one of danger occurrence information, crime occurrence information, and accident occurrence information. The danger occurrence information includes eyewitness information of a suspicious person, for example. The danger occurrence information may include information related to a situation having possibility of occurrence of an accident that does not actually occur, in other words, occurrence information of a scary incident nearly missed. The crime occurrence information includes occurrence information of snatching, for example. The accident occurrence information includes occurrence information of a traffic accident, for example.

The alerting device 1 is a terminal device, for example. The terminal device is a smart device such as a smartphone and a tablet terminal. The alerting device 1 informs a user of alerting information by using a speaker and/or a lamp thereof.

The alerting device 1 includes a position measuring device 10, an input unit 11, a notification unit 12, a communication unit (reception unit) 13, a storage 14, and a control unit 15. At least one of the position measuring device 10 and the input unit 11 may be provided to a device that is different from the alerting device 1.

The position measuring device 10 acquires, in a predetermined period, positional information (for example, GPS information such as latitude and longitude) of the alerting device 1, in other words, positional information of a user; and further determines a position of the alerting device 1 on the basis of the acquired positional information. For example, the position measuring device 10 is Global Navigation Satellite System (GNSS), and receives an electrical wave that is transmitted from a navigation satellite orbiting in the sky to be capable of measuring a position and counting a time. Note that the positional information includes information on a time point when the positional information is acquired.

Figure 3:
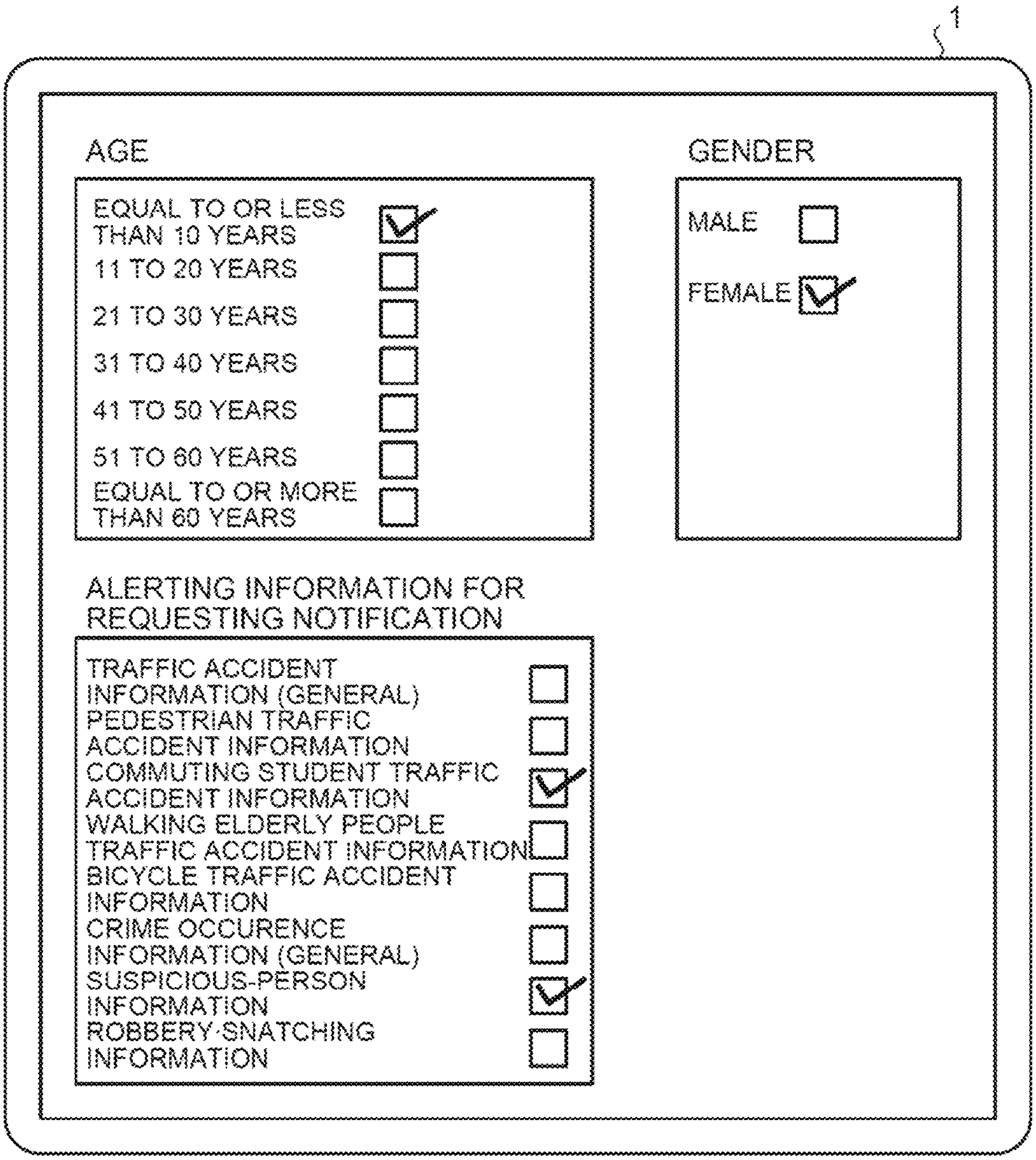
FIG. 3 is a diagram illustrating one example of a screen of the alerting device according to the first embodiment, to which user information is input.

The input unit 11 receives an input of user information. In a case where a user, a protector of a user, or the like operates the input unit 11, user information is input/registered. For example, as illustrated in FIG. 3, user information is input on the basis of a screen that is displayed on a display of the alerting device 1. FIG. 3 is a diagram illustrating one example of a screen of the alerting device 1 according to the first embodiment, to which user information is input. The user information includes, for example, an age of a user, a gender of a user, alerting information for requesting a notification to be transmitted from the information providing device 2, and the like. Furthermore, an information input to the alerting device 1 is here exemplified, an input of user information and other registration information in the present specification is not necessarily via the input unit 11 included in the alerting device 1; however, an input of information to be finally registered in the storage 14 and/or a storage 31 (to be mentioned later) may be realized by an operation input to a device other than the alerting device 1.

Returning to FIG. 2, the notification unit 12 informs a user having the alerting device 1 of alerting information that is received from the information providing device 2. The notification unit 12 includes a speaker, a lamp, and the like. The notification unit 12 informs a user of alerting information by using a sound, for example. The notification unit 12 turns on a lamp thereof or causes the lamp blink so as to inform a user of alerting information, for example. A configuration of the notification unit 12 is not limited to the above-mentioned, and the notification unit 12 may include a vibrator so as to cause the vibrator to raise an alert by using vibration, or may include a display so as to raise an alert by using information displaying in a screen on the display. Additionally, a configuration is exemplified in which the alerting device 1 has a sound outputting function for raising an alert for a user and the like; however, for example, in such a case where a user has a device that is capable of communicating with the alerting device 1 and includes a notification function such as an alarm and a light separately from the alerting device 1, the notification unit 12 may have a configuration that demands activation of the notification function in the above-mentioned separated device (in other words, configuration may be employed in which notification unit 12 is included in device other than alerting device 1).

The communication unit 13 is realized by, for example, NIC and the like. The communication unit 13 is connected to the information providing device 2 to be able to communicate with each other via the network N in a wired and/or wireless manner.

The communication unit 13 transmits, to the information providing device 2, positional information of the alerting device 1, in other words, positional information of a user. The communication unit 13 transmits user information to the information providing device 2. The communication unit 13 receives alerting information from the information providing device 2. Note that the positional information of a user to be transmitted to the information providing device 2 by the communication unit 13 may be information that is determined in the position measuring device 10 on the basis of positional information such as acquired GPS information, or may be GPS information itself that is acquired by the position measuring device 10 and the like.

The storage 14 is realized by a semiconductor memory element such as RAM and a flash memory, or a storage such as a hard disk and an optical disk. The storage 14 stores therein identification information of the alerting device 1. The identification information of the alerting device 1 is information for identifying the alerting device 1. The identification information of the alerting device 1 is set for each of the alerting devices 1. The storage 14 stores therein user information.

The control unit 15 includes a microcomputer including, for example, CPU, ROM, RAM, an input/output port, and the like; and various circuits. The control unit 15 includes an acquisition unit 20 and a generation unit 21 each of which functions by CPU executing various programs stored in ROM while using RAM as a work region.

Note that each of the acquisition unit 20 and the generation unit 21 that are included in the control unit 15 may be partially or totally constituted of hardware such as ASIC and FPGA. Note that each of the acquisition unit 20 and the generation unit 21 may be constituted of a plurality of corresponding divided portions. The acquisition unit 20 and the generation unit 21 may be integrally constituted.

The acquisition unit 20 acquires positional information of a user from the position measuring device 10 via the communication unit 13. The acquisition unit 20 transmits the acquired positional information of a user to the information providing device 2 via the communication unit 13. The acquisition unit 20 ties positional information of a user to identification information of the alerting device 1 so as to transmit it to the information providing device 2.

The acquisition unit 20 acquires user information from the input unit 11. The acquisition unit 20 ties the acquired user information to identification information of the corresponding alerting device 1, and further transmit it to the information providing device 2. The acquisition unit 20 acquires alerting information from the information providing device 2 via the communication unit 13. For example, in such a case where the alerting device 1 is assumed to be commonly used by the same user, the above-mentioned acquisition of user information by the acquisition unit 20 may be executed in such a manner that user information input from the input unit 11 is stored in the storage 14, and the acquisition unit 20 acquires, not via the input unit 11, the user information by reading out corresponding information from the storage 14.

The generation unit 21 generates a control signal for causing the notification unit 12 to raise an alert for a user on the basis of the acquired alerting information. The generation unit 21 generates a control signal according to a notification method by the notification unit 12. The generated control signal is transmitted to the notification unit 12.

The control signal generated by the generation unit 21 is transmitted to the notification unit 12 so as to raise an alert for a user from the notification unit 12.

Figure 4:
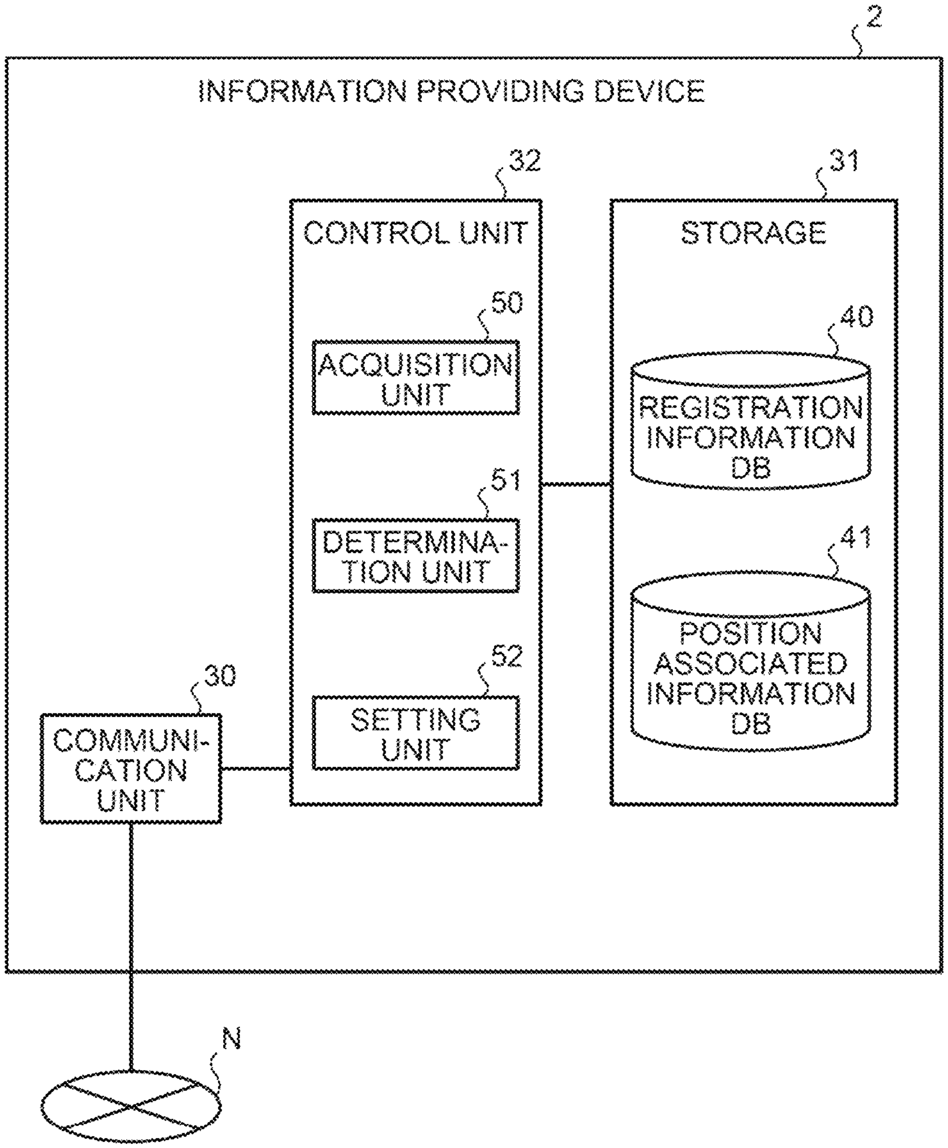
FIG. 4 is a block diagram illustrating one example of a configuration of an information providing device according to the first embodiment.

Next, the information providing device 2 will be explained with reference to FIG. 4. FIG. 4 is a block diagram illustrating one example of a configuration of the information providing device 2 according to the first embodiment. The information providing device 2 is a server device or a workstation, for example. Note that the information providing device 2 may be realized by cloud computing. The information providing device 2 includes a communication unit 30, the storage 31, and a control unit 32. The communication unit 30, the storage 31, and the control unit 32 that are included in the information providing device 2 are not necessarily included in a single device, and may be included in separated devices as long as essential configuration elements thereof are capable of executing necessary communication therebetween.

The communication unit 30 is realized by, for example, NIC and the like. The communication unit 30 is connected to the alerting device 1 to be able to communicate with each other via the network N in a wired and/or wireless manner.

The communication unit 30 receives user information from the alerting device 1. The communication unit 30 receives positional information of a user from the alerting device 1. The communication unit 30 transmits alerting information to the alerting device 1.

The storage 31 is realized by a semiconductor memory element such as RAM and a flash memory, or a storage such as a hard disk and an optical disk. The storage 31 includes a registration information Database (DB) 40 and a position associated information DB 41.

As illustrated in FIG. 5, for example, the registration information DB 40 stores therein data in which user Identifiers (IDs), pieces of user information, and pieces of identification information of the alerting device 1 are respectively tied. The user ID is a user identification information for identifying a user. FIG. 5 is a diagram illustrating one example of the registration information DB 40 according to the first embodiment. Among pieces of the user information, alerting information that requests a notification is stored while being tied to a user ID as a type of notification requested information.

As illustrated in FIG. 6, for example, the position associated information DB 41 ties and stores therein occurrence positional information, position associated information, and the number of occurrences. FIG. 6 is a diagram illustrating one example of the position associated information DB 41 according to the first embodiment.

The occurrence positional information is information indicating a position where an accident or the like occurred. The occurrence positional information includes information related to a latitude and a longitude of a position where an accident or the like occurred, for example. The occurrence positional information may include an area name (e.g., town name) including a position where an accident or the like occurred. The occurrence positional information may include a name (for example, intersection name) that enables to specify a position where an accident or the like occurred. The area name including a position where an accident or the like occurred and/or the name that enables to specify a position where an accident or the like occurred may include information related to a plurality of latitudes and a plurality of longitudes. In a case of information indicating an inner part of a multistory structure such as a building, multistory roads, and the like; information related to a floor number may be also tied thereto.

The position associated information includes information indicating a content of an accident and the like. The position associated information includes at least one of danger occurrence information, crime occurrence information, and accident occurrence information. The number of occurrences is the number of occurrences of accidents and the like. The position associated information may include, for example, information on visibility degree of an intersection, congestion information, and the like. The number of occurrences may be divided at predetermined time intervals, for example, annually.

Returning to FIG. 4, the control unit 32 includes a microcomputer including, for example, CPU, ROM, RAM, an input/output port, and the like; and various circuits. The control unit 32 includes an acquisition unit 50, a determination unit 51, and a setting unit 52 each of which functions by CPU executing various programs stored in ROM while using RAM as a work region.

Note that each of the acquisition unit 50, the determination unit 51, and the setting unit 52 that are included in the control unit 32 may be partially or totally constituted of hardware such as ASIC and FPGA. Note that each of the acquisition unit 50, the determination unit 51, and the setting unit 52 may be constituted of a plurality of corresponding divided portions. The acquisition unit 50, the determination unit 51, and the setting unit 52 may be integrally constituted.

The acquisition unit 50 acquires user information via the communication unit 30. In a case where acquiring user information on a new user, the acquisition unit 50 provides a corresponding user ID to the user. The acquisition unit 50 ties the user ID to user information, and further stores it in the registration information DB 40. The acquisition unit 50 acquires positional information of a user via the communication unit 30.

The determination unit 51 determines whether or not occurrence positional information that coincides with the acquired positional information of a user is stored in the position associated information DB 41. In other words, the determination unit 51 determines whether or not there presents occurrence positional information that coincides with positional information of a user. For example, in a case where a distance between a position of a user and a position in occurrence positional information stored in the position associated information DB 41 is equal to or less than a first predetermined distance, the determination unit 51 determines that the positional information of the user and the occurrence positional information stored in the position associated information DB 41 coincide with each other. The first predetermined distance is a preset value. The first predetermined distance may be set for each piece of occurrence positional information in accordance with occurrence positional information. The first predetermined distance may include a plurality of distances. Herein, a determination process is exemplified, which is based on a distance between a position of a user and a position indicated by occurrence positional information; however, not limited thereto. For example, a movement time interval may be calculated on the basis of an average moving speed, which is calculated on the basis of positional information of a user, and a distance between a position of the user and a position indicated by occurrence positional information, and further whether or not the position indicated by the occurrence positional information is within a predetermined range from a present position of the user may be determined on the basis of the above-mentioned movement time interval.

In a case where occurrence positional information that coincides with the acquired positional information of a user is stored in the position associated information DB 41, the determination unit 51 reads out a user ID coinciding with identification information of the alerting device 1 which is tied to the acquired positional information of the user. The determination unit 51 reads out a type of notification requested information that is tied to the read-out user ID. The determination unit 51 determines whether or not the read-out type of notification requested information and position associated information of the occurrence positional information coincide with each other. In other words, the determination unit 51 determines whether or not a type of position associated information, which is requested to be reported to a user, and a type of position associated information of occurrence positional information coincide with each other.

The setting unit 52 sets alerting information to be reported to a user on the basis of the acquired positional information of the user.

The setting unit 52 sets, as alerting information, position associated information that coincides with a type of notification requested information of a user, among position associated information of occurrence positional information that coincides with positional information of the user. The setting unit 52 sets, as alerting information, position associated information that coincides with positional information of a user and further coincides with a type of notification requested information tied to identification information of the alerting device 1, among position associated information tied to positional information.

In a case where the determination unit 51 determines that the read-out type of notification requested information of a user and position associated information of occurrence positional information coincide with each other, the setting unit 52 sets, as alerting information, the position associated information that coincides with the read-out type of notification requested information of the user. The setting unit 52 transmits the set alerting information to the alerting device 1 via the communication unit 30.

For example, in a case where the acquired positional information of a user is "xxx, yyy1" and further identification information of the alerting device 1, which is tied to the positional information, is "abcde"; the control unit 32 reads out occurrence positional information that coincides with "xxx, yyy1" in positional information of a user, from the position associated information DB 41 illustrated in FIG. 6. The control unit 32 reads out "pedestrian traffic accident", "commuting student traffic accident", and "suspicious-person report" as position associated information corresponding to the occurrence positional information that coincides with "xxx, yyy1" of the positional information of the user.

The control unit 32 reads out "0001" of a user ID whose identification information of the alerting device 1 is "abcde", from the registration information DB 40 illustrated in FIG. 5. The control unit 32 reads out "commuting student traffic accident information" and "suspicious-person information" as a type of notification requested information that is stored while being tied to the user ID "0001". In this case, a type of notification requested information of the read-out user ID includes "commuting student traffic accident information" and "suspicious-person information", and position associated information, which coincides with "xxx, yyy1" of positional information of a user, includes "pedestrian traffic accident", "commuting student traffic accident", and "suspicious-person report". Therefore, the control unit 32 sets, as alerting information, position associated information of "commuting student traffic accident" and "suspicious-person report".

Figure 7:
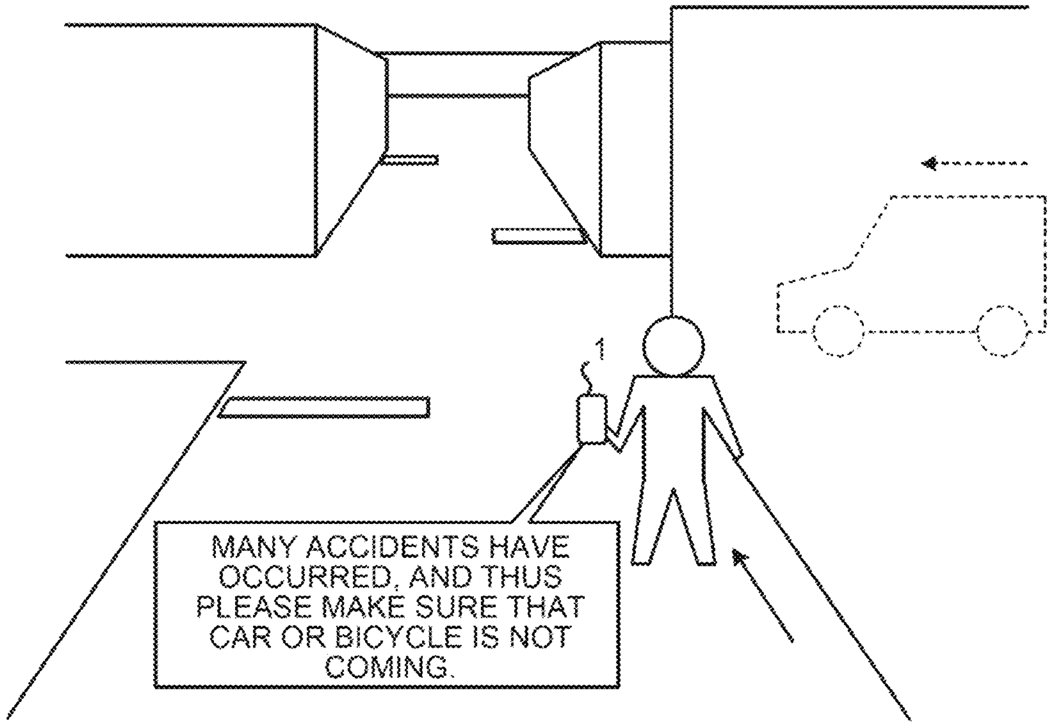
FIG. 7 is a diagram illustrating one example of an alert according to the first embodiment.

For example, in a case where position associated information of "commuting student traffic accident" is set as alerting information, the alerting device 1, to which the alerting information is transmitted, raises an alert as illustrated in FIG. 7. FIG. 7 is a diagram illustrating one example of an alert according to the first embodiment. For example, the alerting device 1 raises an alert by using a sound. For example, the alerting device 1 raises an alert for a user by using a sound, for example, "Many accidents have occurred, and thus please make sure that car or bicycle is not coming".

In a case where an alert is raised for a user on the basis of alerting information, an alert based on the same occurrence positional information is not necessarily raised until a predetermined time interval has elapsed. Moreover, the alert may be repeatedly raised at a plurality of times.

Figure 8:
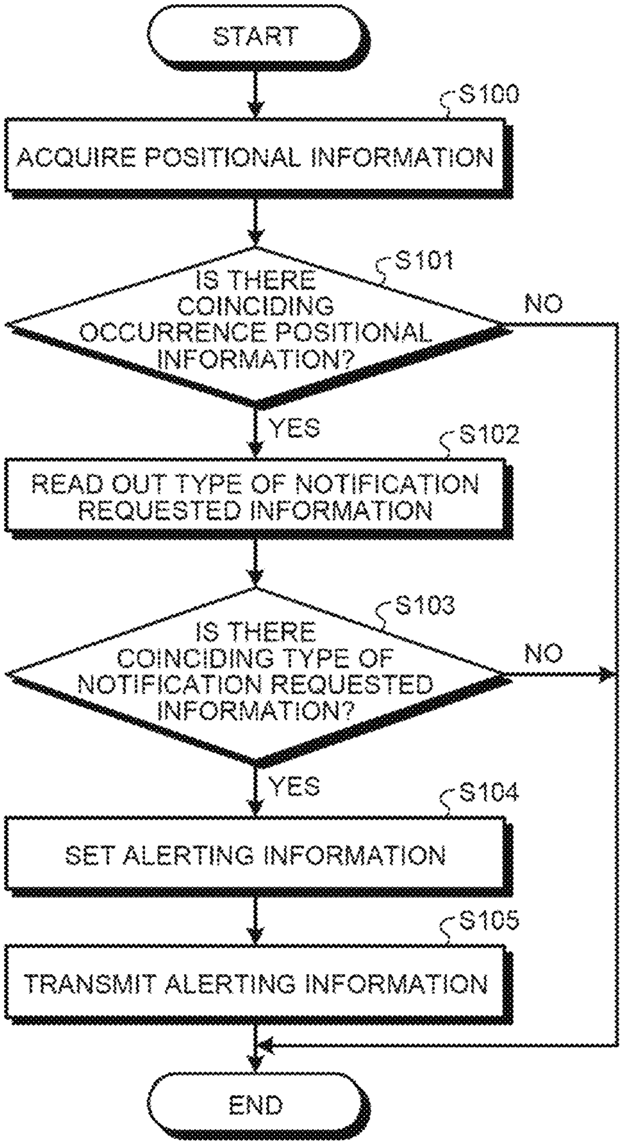
FIG. 8 is a flowchart illustrating a setting process of alerting information according to the first embodiment.

Next, a setting process of alerting information according to the first embodiment will be explained with reference to FIG. 8. FIG. 8 is a flowchart illustrating a setting process of alerting information according to the first embodiment.

In Step S100, the control unit 32 acquires positional information of a user from the alerting device 1. In Step S100, the control unit 32 acquires positional information of a user, and then shifts the processing to Step S101.

In Step S101, the control unit 32 determines whether or not there presents occurrence positional information that coincides with positional information of a user. In a case where there presents no occurrence positional information that coincides with positional information of a user, the control unit 32 ends the present processing. In a case where there presents occurrence positional information that coincides with positional information of a user, the control unit 32 shifts the processing to Step S102.

In Step S102, the control unit 32 reads out a type of notification requested information of a user ID corresponding to the alerting device 1. The control unit 32 reads out a user ID on the basis of identification information of the alerting device 1, and further reads out a type of notification requested information of the read-out user ID. In Step S102, the control unit 32 reads out a type of notification requested information, and then shifts the processing to Step S103. In Step S103, the control unit 32 determines whether or not there presents a type of notification requested information which coincides with position associated information of occurrence positional information. In a case where there presents no type of notification requested information which coincides with position associated information of occurrence positional information, the control unit 32 ends the present processing. In a case where there presents a type of notification requested information which coincides with position associated information of occurrence positional information, the control unit 32 shifts the processing to Step S104.

In Step S104, the control unit 32 sets, as alerting information, position associated information that coincides with a type of notification requested information. In Step S104, the control unit 32 sets the alerting information, and then shifts the processing to Step S105.

In Step S105, the control unit 32 transmits the alerting information to the alerting device 1.

The information providing device 2 includes the control unit 32. The control unit 32 informs a user to be reported of alerting information. The control unit 32 acquires positional information of a user, and further informs, as alerting information, a user of position associated information that coincides with the positional information of the user and further coincides with a type of notification requested information which is tied to identification information of the user, among position associated information tied to occurrence positional information.

Thus, the information providing device 2 is capable of reporting alerting information according to a user. The information providing device 2 is capable of informing a user of alerting information whose notification to the user is desired. The information providing device 2 is capable of reporting alerting information preferable to a user in accordance with positional information of the user.

Position associated information tied to occurrence positional information includes at least one of danger occurrence information, crime occurrence information, and accident occurrence information.

Thus, the information providing device 2 is capable of raising an alert in a user with respect to at least one of danger occurrence information, crime occurrence information, and accident occurrence information. Therefore, the information providing device 2 is capable of further contributing to improvement in the safety of a user.

Second Embodiment

Next, the alerting system 100 according to a second embodiment will be explained. Herein, a part thereof that is different from that of the alerting system 100 according to the first embodiment will be explained. Explanation of configurations and processes thereof that are similar to or equal to those of the alerting system 100 according to the first embodiment is omitted.

Figure 9:
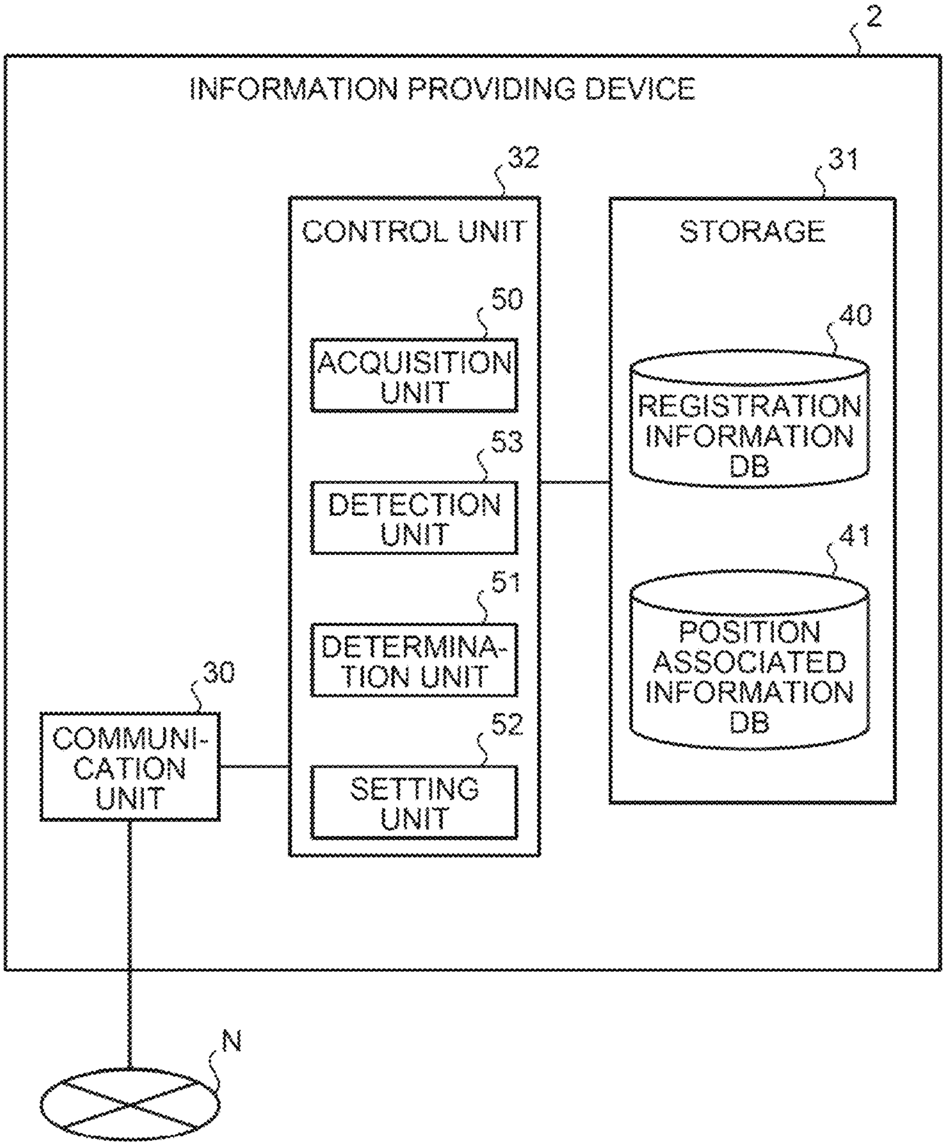
FIG. 9 is a block diagram illustrating one example of a configuration of an information providing device according to a second embodiment.

As illustrated in FIG. 9, the control unit 32 of the information providing device 2 includes the acquisition unit 50, a detection unit 53, the determination unit 51, and the setting unit 52. FIG. 9 is a block diagram illustrating one example of a configuration of the information providing device 2 according to the second embodiment.

The detection unit 53 detects a moving direction of the alerting device 1, in other words, a moving direction of a user on the basis of the acquired positional information of a user.

The determination unit 51 determines whether or not a moving direction of a user is a direction approaching a position indicated by occurrence positional information. In a case where occurrence positional information that coincides with positional information of a user is stored in the position associated information DB 41, the determination unit 51 determines whether or not a moving direction of the user is a direction approaching a position indicated by occurrence positional information. In a case where a moving direction of a user is a direction approaching a position indicated by occurrence positional information, the determination unit 51 reads out a type of notification requested information which is tied to a user ID. The determination unit 51 determines whether or not the read-out type of notification requested information and position associated information of occurrence positional information coincide with each other.

The setting unit 52 sets, as alerting information, position associated information in a case where a moving direction of a user is a direction approaching a position indicated by occurrence positional information. The setting unit 52 sets, as alerting information, position associated information that coincides with a type of notification requested information of a user, among position associated information of occurrence positional information which coincides with positional information of the user.

Note that the setting unit 52 does not set, as alerting information, position associated information in a case where a moving direction of a user is a direction going away from a position indicated by occurrence positional information.

Figure 10:
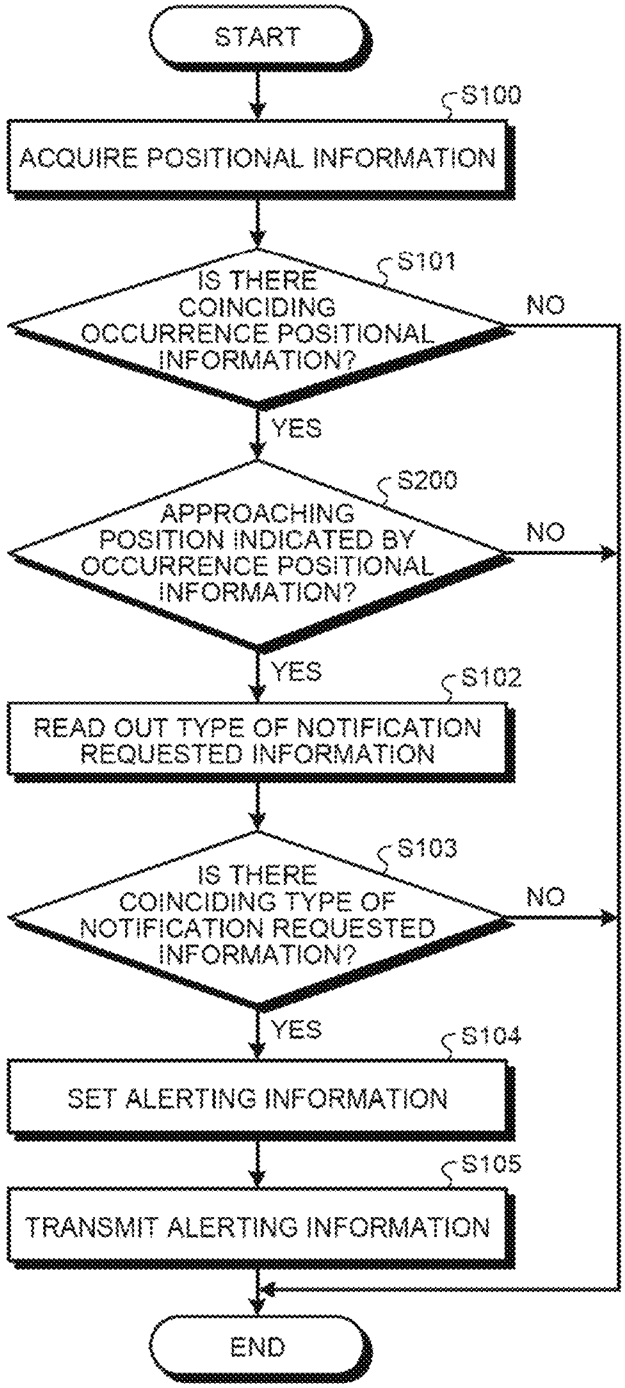
FIG. 10 is a flowchart illustrating a setting process of alerting information according to the second embodiment.

Next, a setting process of alerting information according to the second embodiment will be explained with reference to FIG. 10. FIG. 10 is a flowchart illustrating a setting process of alerting information according to the second embodiment.

Processes of Step S100 and Step S101 are the same as the processes of Step S100 and Step S101 illustrated in FIG. 8. In Step S101, in a case where determining that there presents occurrence positional information coinciding with positional information of a user, the control unit 32 shifts the processing to Step S200.

In Step S200, the control unit 32 determines whether or not a moving direction of a user is a direction approaching a position indicated by occurrence positional information. In a case where a moving direction of a user is not a direction approaching a position indicated by occurrence positional information, the control unit 32 ends the present processing. In a case where a moving direction of a user is a direction approaching a position indicated by occurrence positional information, the control unit 32 shifts the processing to Step S102.

Processes of Step S102 to Step S105 are the same as the processes of Step S102 to Step S105 illustrated in FIG. 8.

In the information providing device 2, the control unit 32 informs, as alerting information, a user of position associated information in a case where a moving direction of the user is a direction approaching a position indicated by occurrence positional information, among position associated information tied to occurrence positional information.

Thus, the information providing device 2 is capable of informing a user of position associated information to be reported to the user. For example, the information providing device 2 does not inform, as alerting information, a user of position associated information in a case where a moving direction of the user is a direction going away from a position indicated by occurrence positional information. Therefore, the information providing device 2 is capable of reporting alerting information preferable to a user alone.

Third Embodiment

Next, the alerting system 100 according to a third embodiment will be explained. Herein, a part thereof that is different from that of the alerting system 100 according to the first embodiment will be explained. Explanation of configurations and processes thereof that are similar to or equal to those of the alerting system 100 according to the first embodiment is omitted. Similar to the information providing device 2 according to the second embodiment illustrated in FIG. 9, the information providing device 2 according to the third embodiment includes the acquisition unit 50, the detection unit 53, the determination unit 51, and the setting unit 52.

The position associated information DB 41 in the storage 31 of the information providing device 2 may store therein advancing direction information corresponding to a position indicated by occurrence positional information while tying it to the occurrence positional information. The advancing direction information includes information related to a direction to be careful about in an advancing direction. For example, the advancing direction information is provided with respect to a part of occurrence positional information.

In the position associated information DB 41, as illustrated in FIG. 11, advancing direction information is provided with respect to a part of occurrence positional information. FIG. 11 is a diagram illustrating one example of the position associated information DB 41 according to the third embodiment. For example, advancing direction information of "Visibility viewed from east side is poor in entering along north-south direction" is tied to occurrence positional information of "intersection in Shibuya 3-chome" to be stored in the position associated information DB 41.

The detection unit 53 detects a moving direction of the alerting device 1, in other words, a moving direction of a user on the basis of the acquired positional information of the user. The detection unit 53 detects a moving direction of a user on the basis of change in positional information of the user.

The determination unit 51 determines whether or not a moving direction of a user coincides with a moving direction in advancing direction information. In a case where occurrence positional information coinciding with positional information of a user is stored in the position associated information DB 41, the determination unit 51 determines whether or not advancing direction information is tied to the occurrence positional information. In a case where advancing direction information is tied to occurrence positional information, the determination unit 51 determines whether or not a moving direction of a user coincides with a moving direction in the advancing direction information tied to the occurrence positional information.

In a case where advancing direction information is not tied to occurrence positional information, the setting unit 52 sets, as alerting information, position associated information that coincides with the read-out type of notification requested information.

In a case where advancing direction information is tied to occurrence positional information, and further a moving direction of a user coincides with a moving direction in the advancing direction information; the setting unit 52 sets, as alerting information, position associated information that coincides with the read-out type of notification requested information and with which the moving direction coincides.

In a case where advancing direction information is tied to occurrence positional information, and further a moving direction of a user does not coincide with a moving direction in advancing direction information; the setting unit 52 does not set, as alerting information, position associated information with which the moving direction does not coincide.

For example, in a case where positional information of a user is "intersection in Shibuya 3-chome" and further identification information of the alerting device 1 is "xyzAab", the control unit 32 reads out occurrence positional information that coincides with positional information of "intersection in Shibuya 3-chome", from the position associated information DB 41 illustrated in FIG. 11. In a case where a moving direction of a user is a direction for entering the above-mentioned intersection along "north-south direction", the moving direction of the user coincides with "entering along north-south direction" that indicates a moving direction in advancing direction information in occurrence positional information of "intersection in Shibuya 3-chome". Therefore, the control unit 32 reads out "traffic accident", "pedestrian traffic accident", "walking elderly people traffic accident", "commuting student traffic accident", and "bicycle traffic accident" as position associated information corresponding to occurrence positional information that coincides with user positional information of "intersection in Shibuya 3-chome".

The control unit 32 reads out a user ID of "0003" whose identification information of the alerting device 1 is "xyzAab", from the registration information DB 40 illustrated in FIG. 5. The control unit 32 reads out "walking elderly people traffic accident" as a type of notification requested information that is tied to the user ID of "0003" to be stored. In this case, a type of notification requested information, which is tied to a user ID, is "walking elderly people traffic accident", and occurrence positional information, which coincides with positional information of a user of "intersection in Shibuya 3-chome", includes "walking elderly people traffic accident". Moreover, a moving direction of a user is a direction for entering the above-mentioned intersection along "north-south direction", and further coincides with "entering along north-south direction" that indicates a moving direction of advancing direction information in occurrence positional information of "intersection in Shibuya 3-chome". Therefore, the control unit 32 sets position associated information of "walking elderly people traffic accident" as alerting information.

Figure 12:
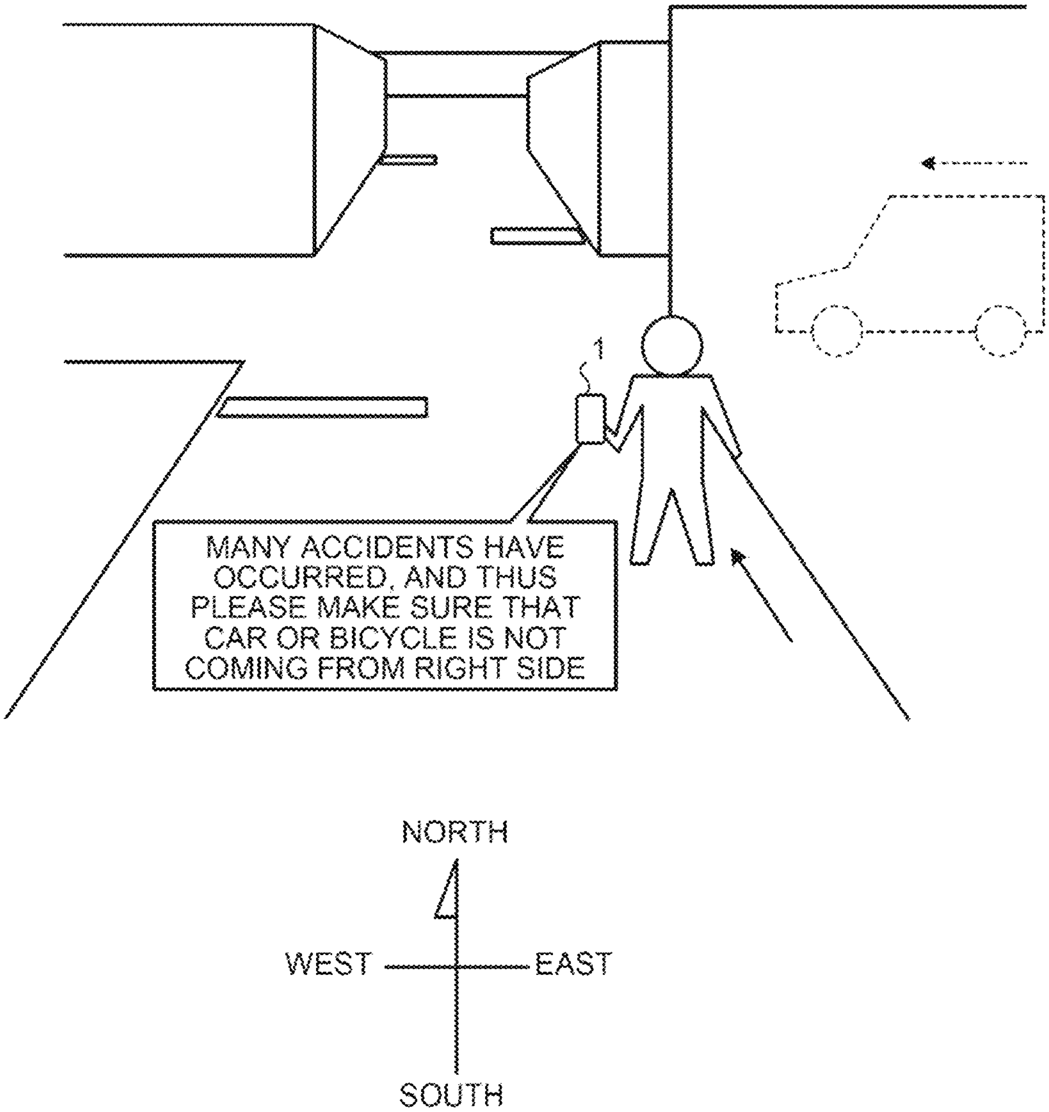
FIG. 12 is a diagram illustrating one example of an alert according to the third embodiment.

For example, as described above, in a case where positional information of a user is "intersection in Shibuya 3-chome", a moving direction of the user is "entering along north-south direction", and further position associated information of "walking elderly people traffic accident" is set as alerting information; the alerting device 1 raises an alert as illustrated in FIG. 12. FIG. 12 is a diagram illustrating one example of an alert according to the third embodiment. For example, the alerting device 1 raises an alert by using a sound. For example, the alerting device 1 raises an alert by using a sound, for example, "Many accidents have occurred, and thus please make sure that car or bicycle is not coming from right side".

Figure 13:
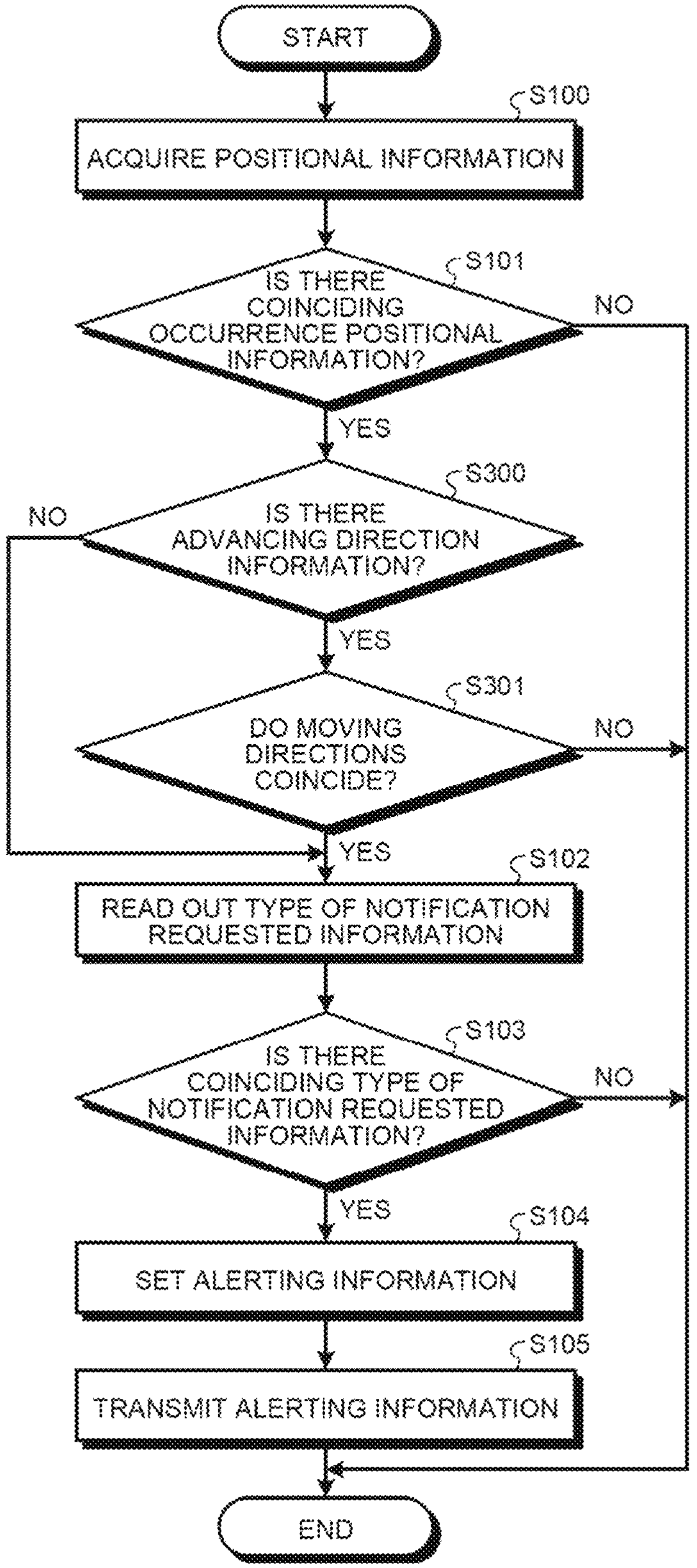
FIG. 13 is a flowchart illustrating a setting process of alerting information according to the third embodiment.

Next, a setting process of alerting information according to the third embodiment will be explained with reference to FIG. 13. FIG. 13 is a flowchart illustrating a setting process of alerting information according to the third embodiment.

Processes of Step S100 and Step S101 are the same as the processes of Step S100 and Step S101 illustrated in FIG. 8. In Step S101, in a case where determining that there presents occurrence positional information coinciding with positional information of a user, the control unit 32 shifts the processing to Step S300.

In Step S300, the control unit 32 determines whether or not there presents advancing direction information in occurrence positional information. The control unit 32 determines whether or not advancing direction information is tied to occurrence positional information. In a case where there presents advancing direction information in occurrence positional information, the control unit 32 shifts the processing to Step S301. In a case where there presents no advancing direction information in occurrence positional information, the control unit 32 shifts the processing to Step S102.

In Step S301, the control unit 32 determines whether or not a moving direction in advancing direction information of occurrence positional information and a moving direction of a user coincide with each other. In a case where a moving direction in advancing direction information of occurrence positional information and a moving direction of a user do not coincide with each other, the control unit 32 ends the present processing. In a case where a moving direction in advancing direction information of occurrence positional information and a moving direction of a user coincide with each other, the control unit 32 shifts the processing to Step S102.

Processes of Step S102 to Step S105 are the same as the processes of Step S102 to Step S105 illustrated in FIG. 8.

In the information providing device 2, occurrence position information includes advancing direction information. The control unit 32 informs, as alerting information, a user of position associated information in a case where a moving direction of the user coincides with a moving direction in advancing direction information, among position associated information tied to occurrence positional information.

Thus, the information providing device 2 is capable of informing a user of position associated information to be reported to the user. For example, the information providing device 2 does not inform, as alerting information, a user of position associated information in a case where a moving direction of the user does not coincide with a moving direction in advancing direction information. Therefore, the information providing device 2 is capable of reporting alerting information preferable to a user alone.

The advancing direction information includes information related to a direction to be careful about in an advancing direction. The control unit 32 informs a user of a direction about which the user should be careful.

Thus, the information providing device 2 informs a user of an alert direction to be able to further contribute to improvement in the safety of the user.

Fourth Embodiment

Next, the alerting system 100 according to a fourth embodiment will be explained. Herein, a part thereof that is different from that of the alerting system 100 according to the first embodiment will be explained. Explanation of configurations and processes thereof that are similar to or equal to those of the alerting system 100 according to the first embodiment is omitted.

Similar to the information providing device 2 according to the second embodiment illustrated in FIG. 9, the information providing device 2 according to the fourth embodiment includes the acquisition unit 50, the detection unit 53, the determination unit 51, and the setting unit 52.

The detection unit 53 detects a moving speed of a user on the basis of positional information of the user.

The determination unit 51 sets a first predetermined distance on the basis of a moving speed of a user. In other words, the determination unit 51 changes a timing for informing a user of danger warning information in accordance with a moving speed of the user. For example, the determination unit 51 increases a first predetermined distance as a moving speed of a user is larger. In other words, the determination unit 51 more advances a timing for reporting danger warning information as a moving speed of a user is larger.

Thus, the information providing device 2 is capable of reporting alerting information at a timing preferable to a user in accordance with a moving speed of the user. Therefore, the information providing device 2 is capable of further contributing to improvement in the safety of a user.

Note that the information providing device 2 according to the fourth embodiment may change a notification timing by the following method.

The detection unit 53 detects a moving direction of a user so as to estimate a position of the user after a predetermined estimated time interval has elapsed on the basis of the moving direction of the user and a moving speed of the user. The predetermined estimated time interval is a preset time interval.

The determination unit 51 determines whether or not the position associated information DB 41 stores therein occurrence positional information that coincides with a position of a user after a predetermined estimated time interval has elapsed. In other words, the determination unit 51 determines whether or not there presents occurrence positional information that coincides with a position of a user after a predetermined estimated time interval has elapsed. For example, in a case where a distance between a position of a user after a predetermined estimated time interval has elapsed and a position indicated by occurrence positional information is equal to or less than a second predetermined distance, the determination unit 51 determines that the position of the user after the predetermined estimated time interval has elapsed and the position indicated by the occurrence positional information coincide with each other. The second predetermined distance is a preset distance. The second predetermined distance is shorter than the first predetermined distance.

In a case where the position associated information DB 41 stores therein occurrence positional information that coincides with a position of a user after a predetermined estimated time interval has elapsed, the determination unit 51 reads out a user ID that coincides with identification information of the alerting device 1. The determination unit 51 reads out a type of notification requested information that is tied to the read-out user ID.

The setting unit 52 transmits, to the alerting device 1, alerting information earlier than a user reaches a position corresponding to the occurrence positional information by a predetermined estimated time interval.

In other words, the alerting device 1 informs a user of alerting information at a notification timing based on a predetermined estimated time interval, earlier than the user reaches a position corresponding to the occurrence positional information by the predetermined estimated time interval. The notification timing may be set depending on a user. For example, in a case where a user is a young person (for example, 21 to 30 years old), the predetermined estimated time interval is set to be longer, in other words, the notification timing is set to be earlier than a case where a user is an elderly person (for example, equal to or more than 61 years old).

By employing the above-mentioned method, the information providing device 2 is also capable of reporting alerting information at a timing preferable to a user in accordance with a moving speed of the user.

Figure 14:
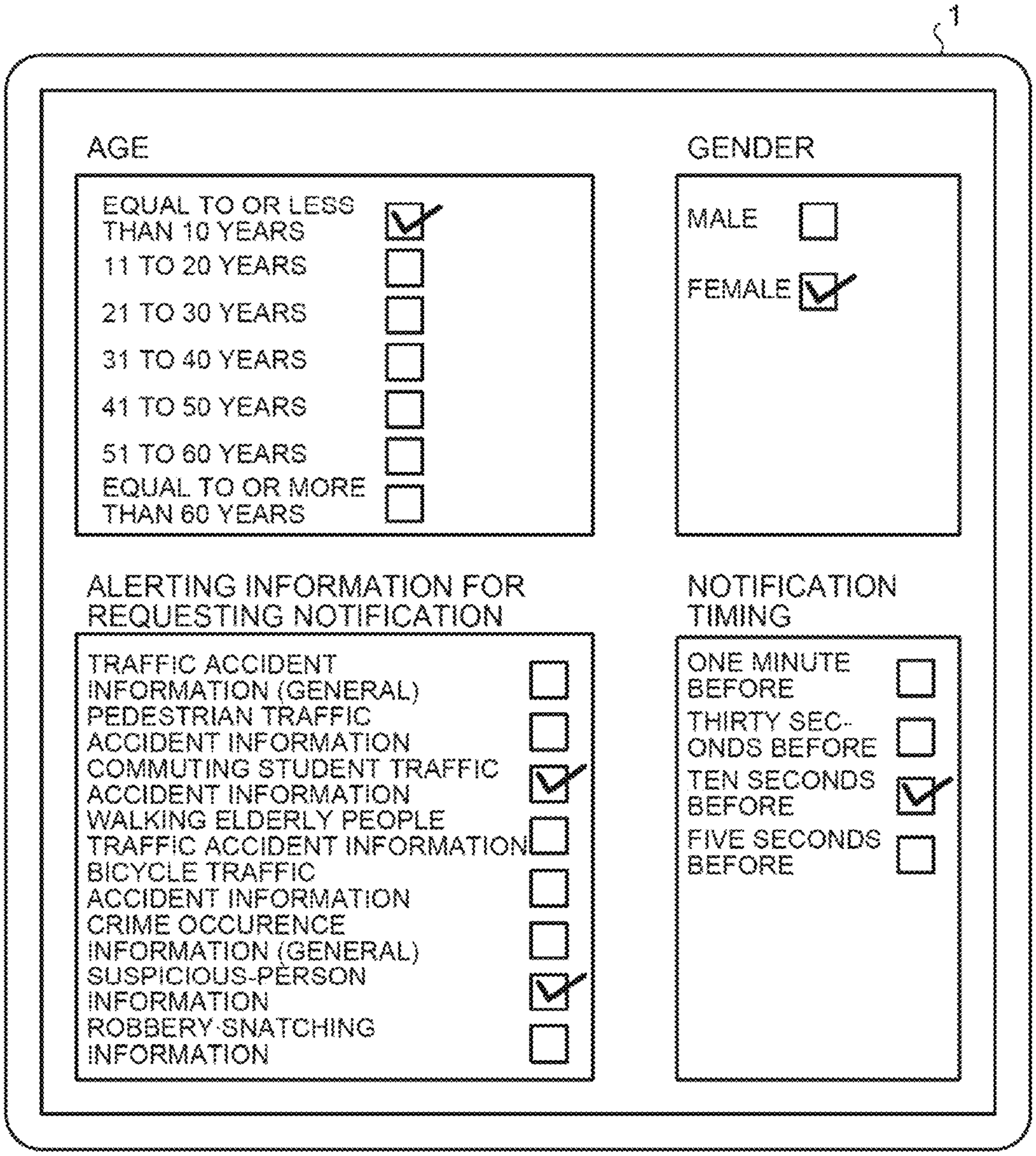
FIG. 14 is a diagram illustrating one example of a screen of an alerting device according to a modification of a fourth embodiment, to which user information is input.

Note that the notification timing, in other words, the predetermined estimated time interval may be set by a user and the like. For example, the notification timing can be set by the alerting device 1. For example, user information that is input by the alerting device 1 includes information related to a notification timing. For example, as illustrated in FIG. 14, a notification timing is input on the basis of a screen that is displayed on a display of the alerting device 1. FIG. 14 is a diagram illustrating one example of a screen of the alerting device 1 according to a modification of the fourth embodiment, to which user information is input. The alerting device 1 transmits user information including a notification timing to the information providing device 2. In the registration information DB 40 of the information providing device 2, as illustrated in FIG. 15, a notification timing is stored for each user ID. FIG. 15 is a diagram illustrating one example of the registration information DB 40 according to the modification of the fourth embodiment.

The information providing device 2 according to the modification may target, as alerting information, position associated information whose number of occurrences is equal to or more than a predetermined number, among position associated information. The predetermined number is a preset number.

The information providing device 2 according to the modification may acquire position associated information from an external device. The external device includes a dashboard camera, a device configured to manage an accident, and the like. In a case where position associated information tied to positional information is acquired from the external device, the position associated information DB 41 of the information providing device 2 stores therein the acquired position associated information while tying it to positional information (namely, occurrence positional information).

Thus, the information providing device 2 is capable of acquiring new position associated information from an external device, so that it is possible to increase position associated information that can be reported to a user. Therefore, the information providing device 2 is capable of further reporting alerting information preferable to a user.

The information providing device 2 according to the modification may cause the alerting device 1 to inform a user of predetermined emergency notification information. The predetermined emergency notification information includes information indicating that a criminal is absconding, information indicating that an animal is escaping, or the like. Regardless of positional information of a user, the information providing device 2 causes the alerting device 1 to inform the user of the predetermined emergency notification information.

Thus, the information providing device 2 according to the modification is capable of informing a user of predetermined emergency notification information.

The information providing device 2 according to the modification may change a notification method of alerting information depending on a user. For example, in a case where a user is an elderly person, the information providing device 2 according to the modification increases sound volume in reporting alerting information. For example, in a case where a user is an elderly person, the information providing device 2 according to the modification may report alerting information at a plurality of times. For example, in a case where a user is a child, the information providing device 2 according to the modification sets a sound in reporting alerting information to one by a plain expression. Note that the change in a notification method of alerting information may be performed by the alerting device 1.

Thus, the information providing device 2 according to the modification is capable of improving a raise of an alert in a user with respect to alerting information.

In the information providing device 2 according to the modification, position associated information may include information such as an occurrence time zone of an accident and the like. In a case where a passage time point of a user is included in an occurrence time zone of an accident and the like, the information providing device 2 according to the modification may transmit alerting information to the alerting device 1. In other words, position associated information stored in the position associated information DB 41 includes notification time interval information. The notification time interval information is information on an occurrence time zone of an accident and the like. The information providing device 2 transmits, as alerting information to the alerting device 1, position associated information in a case where a passage time point of a user is included in an occurrence time zone that is a time interval related to notification time interval information, among position associated information so as to report it to the user.

Thus, the information providing device 2 according to the modification is capable of informing a user of position associated information to be reported to the user. For example, the information providing device 2 does not inform, as alerting information, a user of position associated information in a case where a passage time point of the user is outside a time interval related to notification time interval information. Therefore, the information providing device 2 is capable of reporting alerting information preferable to a user alone.

The alerting device 1 according to the modification may give a notification that raises an alert for a person around a user (for example, for third person around user). For example, the alerting device 1 may give a notification that raises an alert for a person around a user by using a sound. The alerting device 1 may turn on a lighting device or causes the lighting device to blink so as to give a notification that raises an alert for a person around a user.

Thus, the alerting device 1 according to the modification is capable of improving the safety of a user.

The information providing device 2 according to the modification may change a notification method of alerting information in accordance with a time zone, ambient brightness, and the like. For example, in a case where the periphery of a user is dark, the information providing device 2 transmits alerting information for turning on the lighting device to the alerting device 1. For example, in a case where the periphery of a user is bright, the information providing device 2 transmits alerting information for raising an alert by using a sound to the alerting device 1. Thus, the information providing device 2 according to the modification is capable of improving the safety of a user. Note that the notification method may be changed by the alerting device 1.

The information providing device 2 according to the modification may transmit, to the alerting device 1, information on a detour that bypasses a position in occurrence positional information. The information providing device 2 may transmit information on a detour to the alerting device 1 on the basis of user information. For example, the information providing device 2 transmits information on a detour to the alerting device 1 on the basis of an age and/or a gender of a user. The information providing device 2 may change a detour on the basis of an age and/or a gender of a user. In a case where a user deviates from a detour, the information providing device 2 may warn the user against deviation from the detour by using a sound, turning on/off of a lamp, a vibration, displaying an image, etc.

Each of the alerting device 1 and the information providing device 2 includes a computer-readable recording medium storing therein a program for implementing the above-mentioned processes. CPU reads out a program recorded in the recording medium to be capable of executing the above-mentioned processes. The computer-readable recording medium includes the above-mentioned semiconductor memory such as ROM, a magnetic disk, a magnetic optical disk, or and the like.

According to the above-mentioned embodiments, for example, it is possible to provide the following alerting system.

(1) An alerting system including:
a notification unit that reports alerting information; and
a control unit that informs a target person of the alerting information, the target person being a target of a notification, wherein
the control unit is configured to:
acquire positional information of the target person; and
inform, as the alerting information, the target person of position associated information that coincides with positional information of the target person and that coincides with a type of position associated information tied to identification information of the target person, among position associated information tied to positional information.

(2) The alerting system according to (1), wherein
the control unit is further configured to:
inform, as the alerting information, the target person of position associated information in a case where a moving direction of the target person is a direction approaching a position indicated by the positional information tied to position associated information, among position associated information tied to positional information.

(3) The alerting system according to (1), wherein
the control unit is further configured to:
regardless of the positional information of the target person, inform the target person of predetermined emergency notification information.

(4) The alerting system according to any one of (1) to (3) further including:
a storage that stores therein, in a case where the position associated information tied to the positional information is acquired from an external device, the acquired position associated information tied to the positional information.

(5) The alerting system according to any one of (1) to (3) further including:
the control unit is further configured to:
change a notification method of the alerting information depending on the target person.

(6) The alerting system according to any one of (1) to (3), wherein
the position associated information tied to the positional information includes advancing direction information, and
the control unit is further configured to:
inform, as the alerting information, the target person of position associated information in a case where a moving direction of the target person coincides with a moving direction in the advancing direction information, among position associated information tied to positional information.

(7) The alerting system according to (6), wherein
the advancing direction information includes information related to a direction to be careful about in an advancing direction, and
the control unit is further configured to:
inform the target person of the direction about which the target person should be careful.

(8) The alerting system according to any one of (1) to (3), wherein
the control unit is further configured to:
change a timing for informing the target person of the alerting information in accordance with a moving speed of the target person.

(9) The alerting system according to any one of (1) to (3), wherein
the control unit is further configured to:
change a timing for informing the target person of the alerting information depending on the target person.

(10) The alerting system according to any one of (1) to (3), wherein
the position associated information tied to the positional information includes notification time interval information, and
the control unit is further configured to:
inform, as the alerting information, the target person of position associated information in a case where a passage time point of the target person is included in a time interval related to the notification time interval information, among position associated information tied to positional information.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The information providing device 2, the information providing method, and the alerting device 1 according to the present disclosure are capable of contributing to Goal 3 (Good Health and Well-Being) of Sustainable Development Goals (SDGs) approved by the United Nations.

The invention claimed is:

1. An information providing device comprising:
a processor configured to:
acquire positional information of a target person;
acquire movement information of the target person, the movement information including at least a moving direction and a moving speed of the target person based on a change in the positional information of the target person over time;
refer to position associated information tied to the positional information of the target person, the position associated information including:

(i) occurrence positional information indicating an occurrence position of at least one of danger occurrence information, crime occurrence information, and accident occurrence information; and
(ii) notification time interval information indicating an occurrence time zone of at least one of the danger occurrence information, the crime occurrence information, and the accident occurrence information at the occurrence position;

determine, as a first determination, whether a distance between the positional information of the target person and the occurrence positional information is equal to or less than a first predetermined distance;

estimate, based on the moving direction and the moving speed of the target person, a future position of the target person after a predetermined estimated time interval has elapsed from a current time;

determine, as a second determination, whether a distance between the future position of the target person and the occurrence positional information is equal to or less than a second predetermined distance that is shorter than the first predetermined distance;

determine a passage time point at which the target person is estimated to pass through the future position based on the movement information; and inform, as alerting information, the target person of the position associated information in a case where:
(i) the passage time point of the target person is included in the occurrence time zone related to the notification time interval information, and
(ii) at least one of the first determination and the second determination is affirmative.

2. The information providing device according to claim 1, wherein the processor is further configured to:

inform, as the alerting information, the target person of the position associated information in a case where the moving direction of the target person is a direction approaching a position indicated by the positional information tied to the position associated information.

3. The information providing device according to claim 1, wherein the processor is further configured to:

regardless of the positional information of the target person, inform the target person of predetermined emergency notification information.

4. The information providing device according to claim 1 further comprising:

a storage that stores therein, in a case where the position associated information tied to the positional information is acquired from an external device, the acquired position associated information tied to the positional information.

5. The information providing device according to claim 1, wherein the processor is further configured to:

change a notification method of the alerting information depending on the target person.

6. The information providing device according to claim 1, wherein the position associated information tied to the positional information includes advancing direction information, and the processor is further configured to:

inform, as the alerting information, the target person of the position associated information in a case where the moving direction of the target person coincides with a moving direction in the advancing direction information.

7. The information providing device according to claim 6, wherein the advancing direction information includes information related to a direction to be careful about in an advancing direction, and the processor is further configured to:

inform the target person of the direction about which the target person should be careful.

8. The information providing device according to claim 1, wherein the processor is further configured to:

change a timing for informing the target person of the alerting information in accordance with the moving speed of the target person.

9. The information providing device according to claim 1, wherein the processor is further configured to:

change a timing for informing the target person of the alerting information depending on the target person.

10. The information providing device according to claim 1, wherein the position associated information tied to the positional information includes at least one of danger occurrence information, crime occurrence information, and accident occurrence information.

11. An information providing method comprising:

acquiring positional information of a target person that is a target of a notification;

acquiring movement information of the target person, the movement information including at least a moving direction and a moving speed of the target person based on a change in the positional information of the target person over time;

referring to position associated information tied to the positional information of the target person, the position associated information including: (i) occurrence positional information indicating an occurrence position of at least one of danger occurrence information, crime occurrence information, and accident occurrence information; and (ii) notification time interval information indicating an occurrence time zone of at least one of the danger occurrence information, the crime occurrence information, and the accident occurrence information at the occurrence position;

determining, as a first determination, whether a distance between the positional information of the target person and the occurrence positional information is equal to or less than a first predetermined distance;

estimating, based on the moving direction and the moving speed of the target person, a future position of the target person after a predetermined estimated time interval has elapsed from a current time;

determining, as a second determination, whether a distance between the future position of the target person and the occurrence positional information is equal to or less than a second predetermined distance that is shorter than the first predetermined distance;

determining a passage time point at which the target person is estimated to pass through the future position based on the movement information; and informing, as alerting information, the target person of position associated information in a case where:
(i) the passage time point of the target person is included in the occurrence time zone related to the notification time interval information; and
(ii) at least one of the first determination and the second determination is affirmative.

12. An alerting device comprising:

a communication interface that receives alerting information for a target person that is a target of a notification; and a notification output interface that reports the received alerting information, wherein the alerting information is position associated information tied to the positional information of the target person, the position associated information including: (i) occurrence positional information indicating an occurrence position of at least one of danger occurrence information, crime occurrence information, and accident occurrence information; and (ii) notification time interval information indicating an occurrence time zone of at least one of the danger occurrence information, the crime occurrence information, and the accident occurrence information at the occurrence position, and the alerting information is provided to the target person in a case where: (i) a passage time point of the target person is included in the occurrence time zone related to the notification time interval information, and (ii) at least one of a first determination and a second determination is affirmative, the first determination being whether a distance between the positional information of the target person and the occurrence positional information is equal to or less than a first predetermined distance, the second determination being whether a distance between a future position of the target person estimated based on a moving direction and a moving speed of the target person and the occurrence positional information is equal to or less than a second predetermined distance that is shorter than the first predetermined distance.

* * * * *